United States Patent
Allochis (10) Patent No.: US 9,258,944 B2
(45) Date of Patent: Feb. 16, 2016

(54) FLEXIBLE PLATFORM JOINED TO A CONVEYOR BELT FOR A COMBINE HARVESTER

(76) Inventor: Jose Luis Allochis, Buenos Aires (AR)

(*) Notice: Subject to any disclaimer, the term of this patent is extended or adjusted under 35 U.S.C. 154(b) by 623 days.

(21) Appl. No.: 13/593,555

(22) Filed: Aug. 24, 2012

(65) Prior Publication Data

US 2012/0317953 A1 Dec. 20, 2012

Related U.S. Application Data

(63) Continuation-in-part of application No. 13/153,646, filed on Jun. 6, 2011, now Pat. No. 8,272,198.

(51) Int. Cl.
*A01D 43/00* (2006.01)
*A01D 57/20* (2006.01)

(52) U.S. Cl.
CPC ..................... *A01D 57/20* (2013.01)

(58) Field of Classification Search
CPC ............................. A01D 57/20; A01D 43/00
USPC ........... 56/153, 155, 158, 162, 181, 182, 192, 56/14.5, 15.8, 345
See application file for complete search history.

(56) References Cited

U.S. PATENT DOCUMENTS

| | | | | |
|---|---|---|---|---|
| 885,157 A * | 4/1908 | Hovland | | 56/14.5 |
| 2,599,438 A * | 6/1952 | Downing et al. | | 56/158 |
| 2,644,284 A * | 7/1953 | Oberholtz et al. | | 56/14.6 |
| 2,832,187 A * | 4/1958 | Johnson | | 56/207 |
| 3,412,535 A * | 11/1968 | Drummond | | 56/14.4 |
| 3,468,107 A * | 9/1969 | Van Der Lely | | 56/11.9 |
| 3,982,383 A * | 9/1976 | Mott | | 56/11.6 |
| 4,177,626 A * | 12/1979 | McNaught | | 56/14.5 |
| 4,446,683 A * | 5/1984 | Rempel et al. | | 56/296 |
| 4,487,004 A * | 12/1984 | Kejr | | 56/14.4 |
| 4,663,921 A * | 5/1987 | Hagstrom et al. | | 56/14.6 |
| 4,956,966 A * | 9/1990 | Patterson | | 56/181 |
| 5,005,343 A * | 4/1991 | Patterson | | 56/14.4 |
| 5,464,371 A * | 11/1995 | Honey | | 460/20 |
| 6,675,568 B2 * | 1/2004 | Patterson et al. | | 56/208 |
| 7,478,521 B2 * | 1/2009 | Coers et al. | | 56/208 |
| 7,640,720 B1 * | 1/2010 | Lovett et al. | | 56/181 |
| 7,788,891 B2 * | 9/2010 | Puryk et al. | | 56/181 |
| 7,992,372 B1 * | 8/2011 | Coers et al. | | 56/153 |
| 8,272,198 B1 * | 9/2012 | Allochis | | 56/153 |
| 8,336,280 B2 * | 12/2012 | Lovett et al. | | 56/208 |
| 2002/0129591 A1 * | 9/2002 | Patterson et al. | | 56/158 |
| 2008/0276590 A1 * | 11/2008 | Sauerwein et al. | | 56/153 |
| 2008/0295473 A1 * | 12/2008 | Tippery et al. | | 56/14.5 |
| 2008/0295474 A1 * | 12/2008 | Tippery et al. | | 56/14.5 |
| 2009/0007534 A1 * | 1/2009 | Sauerwein et al. | | 56/14.5 |
| 2009/0320431 A1 * | 12/2009 | Puryk et al. | | 56/181 |
| 2012/0042617 A1 * | 2/2012 | Dow et al. | | 56/14.5 |

* cited by examiner

*Primary Examiner* — Thomas B Will
*Assistant Examiner* — Joan D Misa
(74) *Attorney, Agent, or Firm* — Defillo & Associates, Inc.; Evelyn A. Defillo (57) ABSTRACT

A flexible platform jointed to a conveyor belt for a combined harvesting, chopping and spinning machine includes a central assembly of parallel augers and an oblique auger on each side of the assembly.

17 Claims, 10 Drawing Sheets

FLEXIBLE PLATFORM JOINED TO A CONVEYOR BELT FOR A COMBINE HARVESTER

CROSS REFERENCE TO RELATED APPLICATION

This application is a continuation-in-part of U.S. patent application Ser. No. 13/153,646 filed Jun. 6, 2011, now U.S. Pat. No. 8,272,198 allowed, entitled FLEXIBLE PLATFORM JOINTED TO A CONVEYOR BELT FOR A COMBINED HARVESTING, CHOPPING AND SPINNING MACHINE, the contents of which are herein incorporated by reference.

TECHNICAL FIELD

The present invention relates to a flexible platform jointed to a conveyor belt for a harvesting, spinning, and chopping machine which improves the functioning of all the platform width, and eliminates deficiencies related to the material, cereal or grain transport, with a transporting auger in all its width, obtaining a more homogeneous and smoother material flow.

BACKGROUND OF THE INVENTION

In regards to the previous art of the present invention, it is worth highlighting platforms with transporting augers and conveyor belt platforms or canvas, as they were named in the past, which were rigid or without movement, except from its own turn, in all its length and without the possibility of copying the land in which they worked. This aforementioned canvas consisted of a conveyor belt on each side of the feeder and a central vertical belt.

It is worth mentioning that for some cereal harvesting or products, the aforementioned conveyor belts have to be flexible, that is to say, they must allow the belt to take such an angle that it must copy the land and said form to adapt to land irregularities, being one of the main objectives of the present invention to develop a cutting platform which fulfills the demands of farming in lands with irregularities.

The proposed platform in a preferential embodiment is built with high technology materials and low weight materials such as steel, plastic and aluminum or such material's alloys.

The present platform is developed with several conveyor belts, located parallel to one another on each lateral side of said platform, back belts being rigid or without movement (except for the belt's own turn) regardless of the land where it works; existing front conveyor belts, which bend or joint in relation to the back conveyor belts, allowing to change its position and accepting land irregularities.

In a preferential embodiment, the proposed platform allows turn revolutions or belt velocity to be the same or different in back conveyor belts in relation to the belts' velocity of the front belts, likewise allowing it to be of a different width, length or material and to have different shapes.

Other important aspect is that both conveyor belts are split through its width into multiple pieces letting belts to have several clearance spacing, which brings the multiple point self-cleaning characteristic to conveyor floor.

The back conveyor belt and the front conveyor belt will carry the cereal, grain or material towards the central conveying system, that comprises of a set of synchronized augers, where it is first taken by the oblique side augers and then moved to the combine feeder by the horizontal augers.

Likewise, the cutting system is also synchronized to eliminate cutting-blade vibration, for that reason it was built with a gear-box and a control gear, in order not to be slipped or moved in both sides.

The conveyor belts can be activated mechanically or hydraulically, with any of the mechanisms known today to give movement to these types of belts.

By being the flexible front conveyor belt, it can vary its angle in relation to the back conveyor belt, having up to 200 mm trajectory.

SUMMARY OF THE INVENTION

In one aspect of the present invention, a flexible platform jointed to a conveyor belt for a combined harvesting, chopping and spinning machine includes two adjacent parallel conveyor belts. The conveyor belt adjacent to the cutting blade is movable in relation to the other belt.

On the other side of the invention, the flexible platform jointed to a conveyor belt for a combined harvesting, chopping and spinning machine includes a central assembly of parallel augers and an oblique auger on each side of the assembly.

These and other features, aspects and advantages of the present invention will become better understood with reference to the following drawings, description and claims.

BRIEF DESCRIPTION OF THE DRAWINGS

In order for this present invention to be clearly understood and taken into practice easily, it has been presented in one of its preferred embodiments in the illustrative drawings and not limitative in which.

In aforementioned figures, the reference numbers indicate same or corresponding elements of the invention.

DETAILED DESCRIPTION OF THE INVENTION

It is observed in FIGS. 1 to 7 a platform 15 having a first conveyor belt 1 and a second conveyor belt 2, which are turned by rollers located in their ends. The first conveyor belt 1 and the second conveyor belt 2 moves the cereal towards the center of the platform 15, where augers 3 and auger 4 are located. Multiple synchronized augers moves the cereal coming to the center of the platform 15 to the combine feeder. In the embodiment, auger 16 moves the cereal to the auger 17 which takes it to the harvester feeder 20.

The second conveyor belt 2, has a rigid belt, without movement except from its own turn. The first conveyor belt 1 is located adjacent to the second conveyor belt 2. The first conveyor belt 1, which apart from its own turning movement, has flexibility and includes movement with regards to the second conveyor belt 2 that allows to adapt to the land irregularities.

It is evident that the number of first conveyor belts 1 and the second conveyor belts 2, depends on the width of the platform 15. In one embodiment, the platform 15 includes a first conveyor belt 1 and a second conveyor belt 2 on each side of the feeder 20. As aforementioned, the platform 15 contains two augers 3 and 4, and retractable fingers 5.

Figures 4A, 4B:
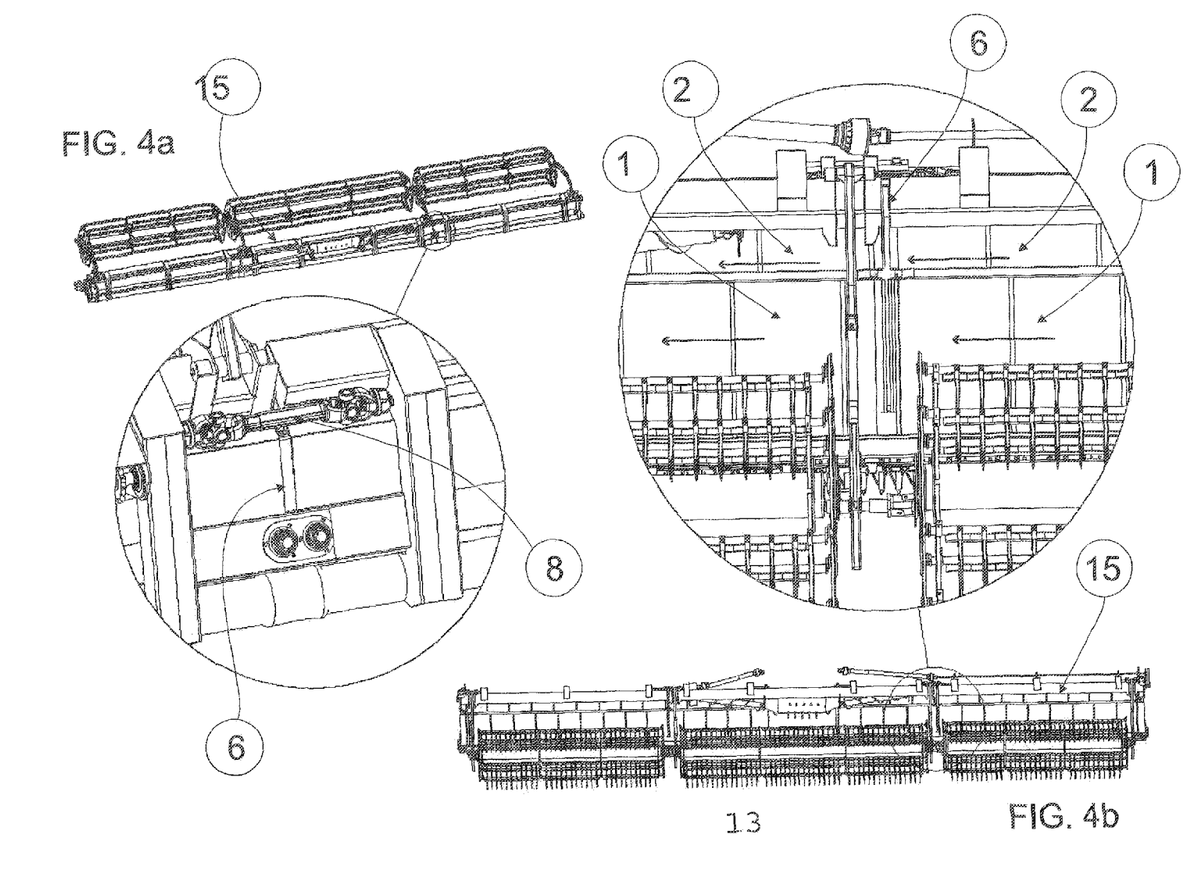
Figure 5:
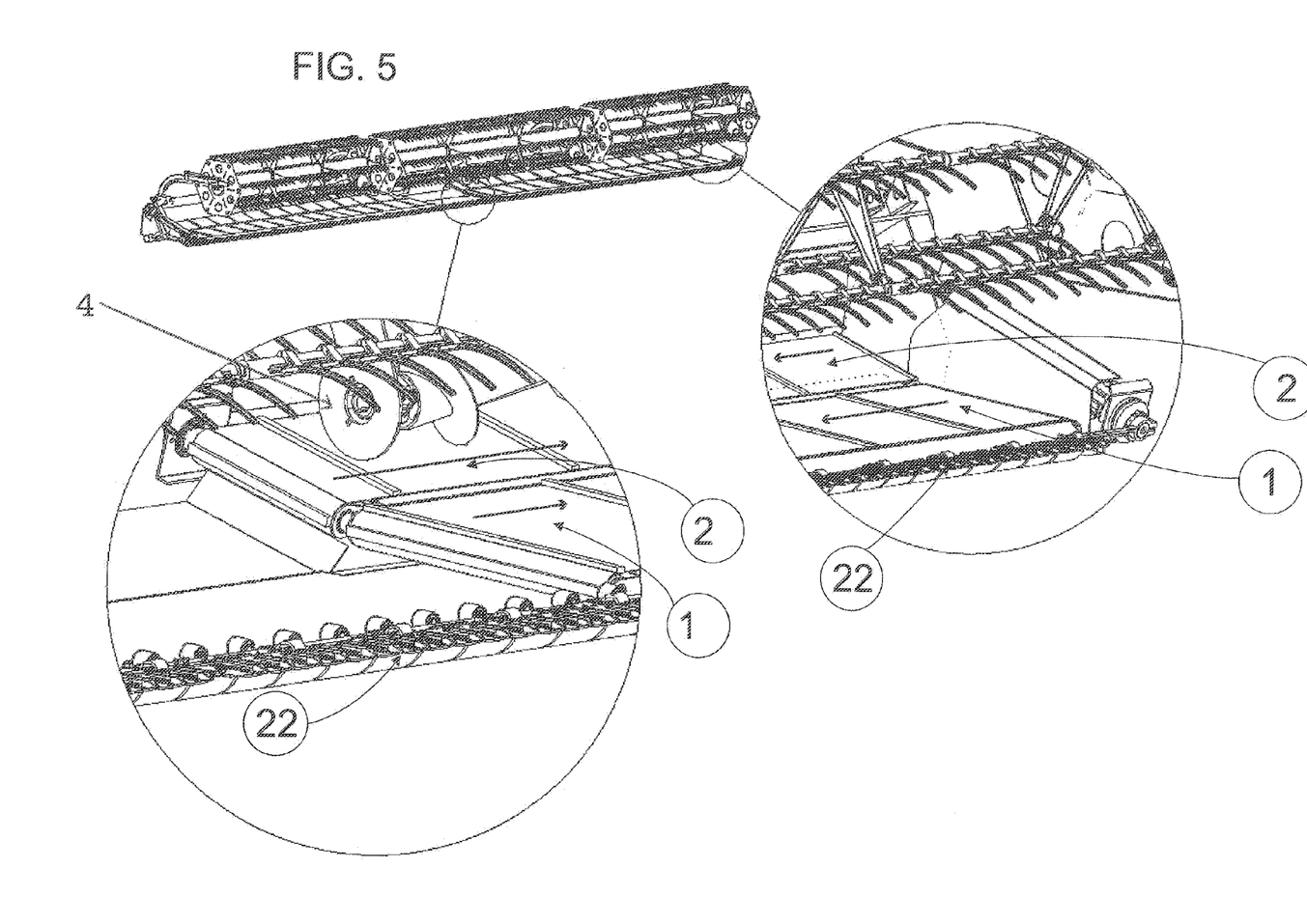
Figure 6:
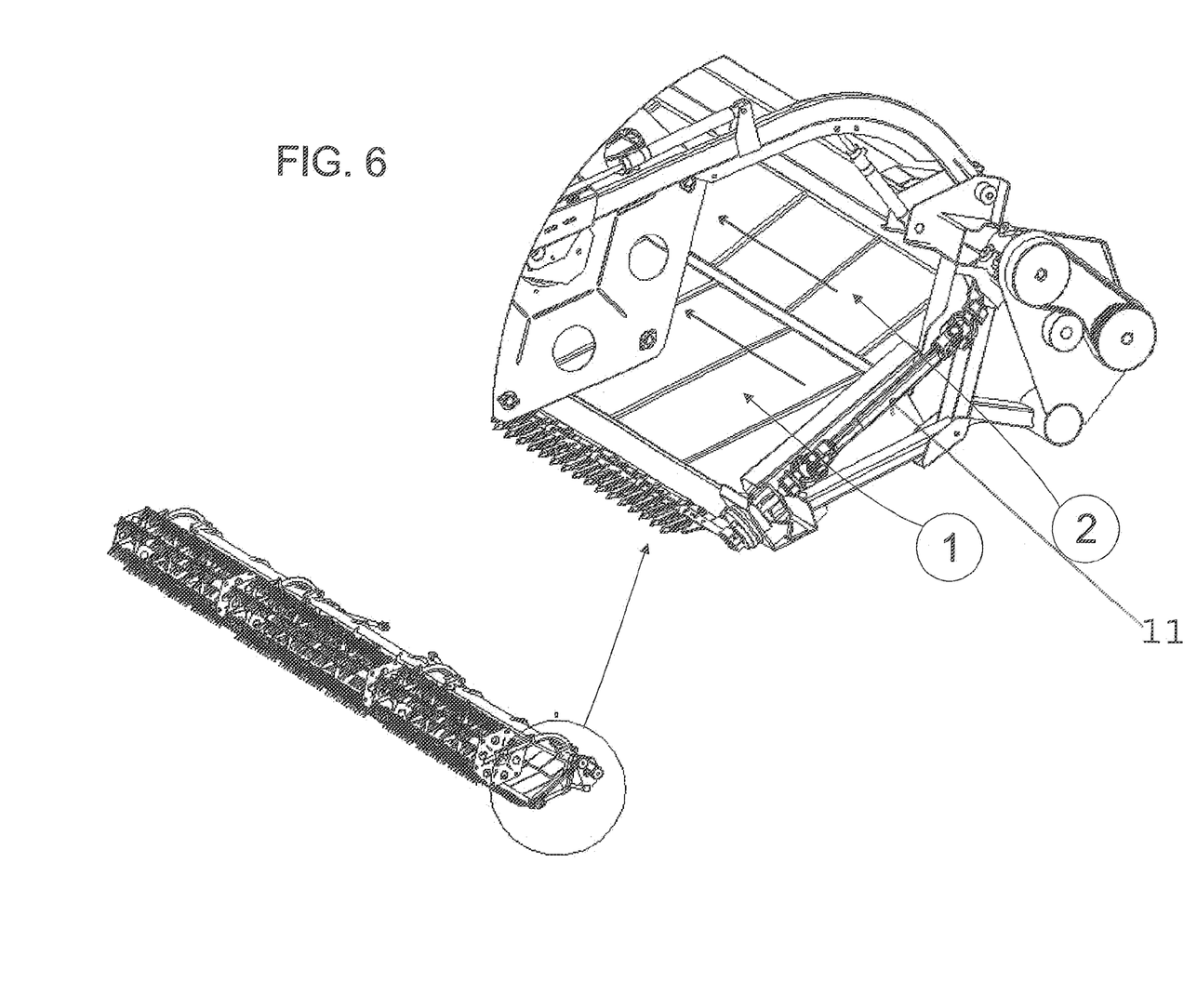
FIG. 6 shows a perspective of the control box and of the blades and the activation of the same.
Figure 7:
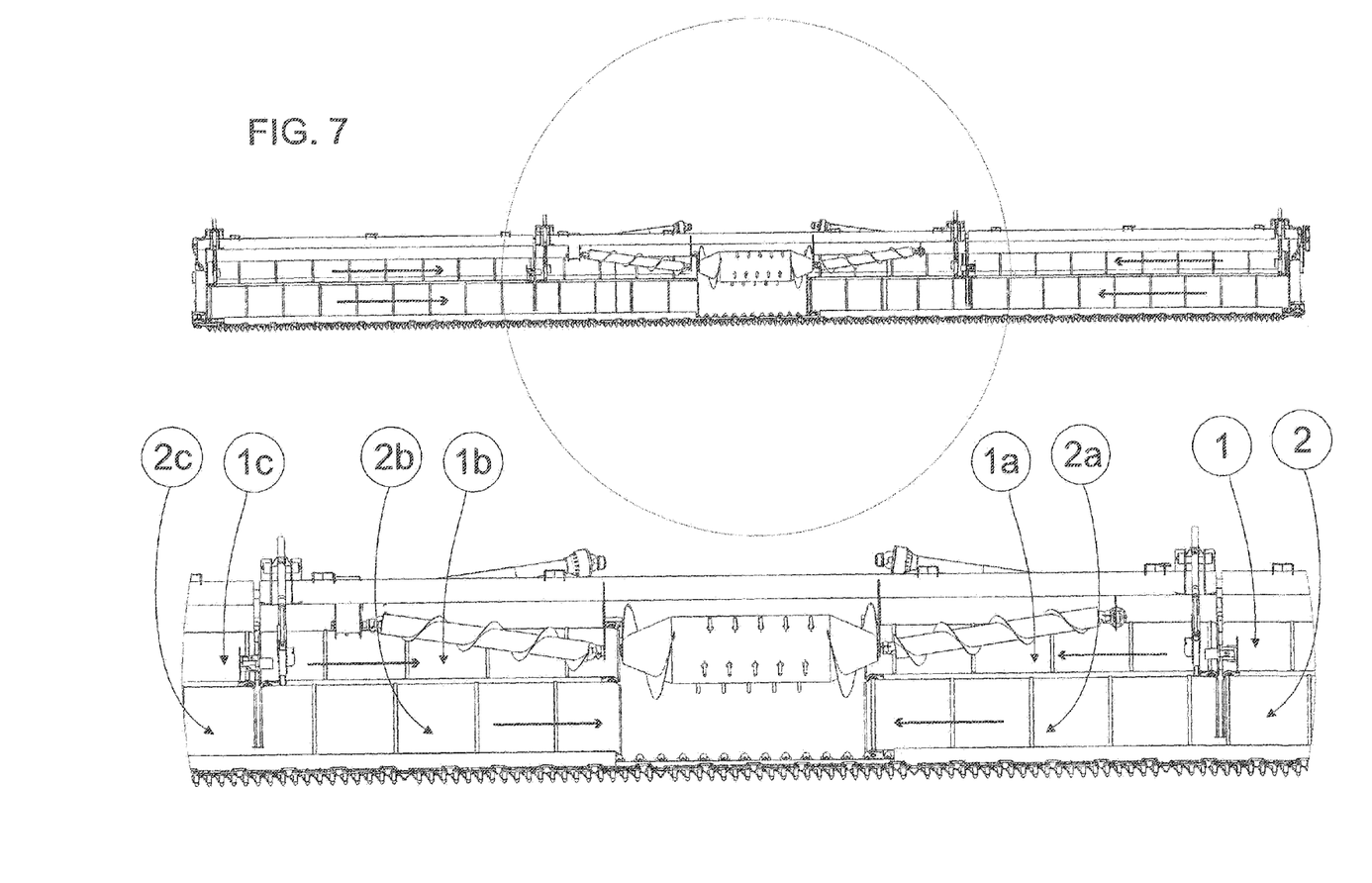
FIG. 7 shows a perspective front view of the flexible platform according to another exemplary embodiment of the present invention showing more than one first conveyor belt and more than one second conveyor belt.

In the embodiment show on FIG. 7, when the platform 15 is wider than 10.50 meters (35 feet), the platform 15 includes two first conveyor belts 1a, 1b and two second conveyor belts 2a, 2b placed on one side of the platform 15 and two first conveyor belts 1c, 1d and two second conveyor belts 2c, 2d on the other side of the platform 15. This is also the case for an articulated flexible platform, since it is so wide that using only one first conveyor belt 1 and one second conveyor belt is not enough to cover the land irregularities. In this case, joints 6 are placed on the left and right sides as it is shown in FIG. 4. This joint 6 is activate by a pneumatic pump, hydraulic pump, or it can be a mechanical joint FIG. 2.

The present platform 15 includes a first conveyor belt 1 and a second conveyor belt 2, which differs from the currently known platforms that have a belt on each side with the total width of the first conveyor belt 1 plus the one of the second conveyor belt 2.

Figure 1:
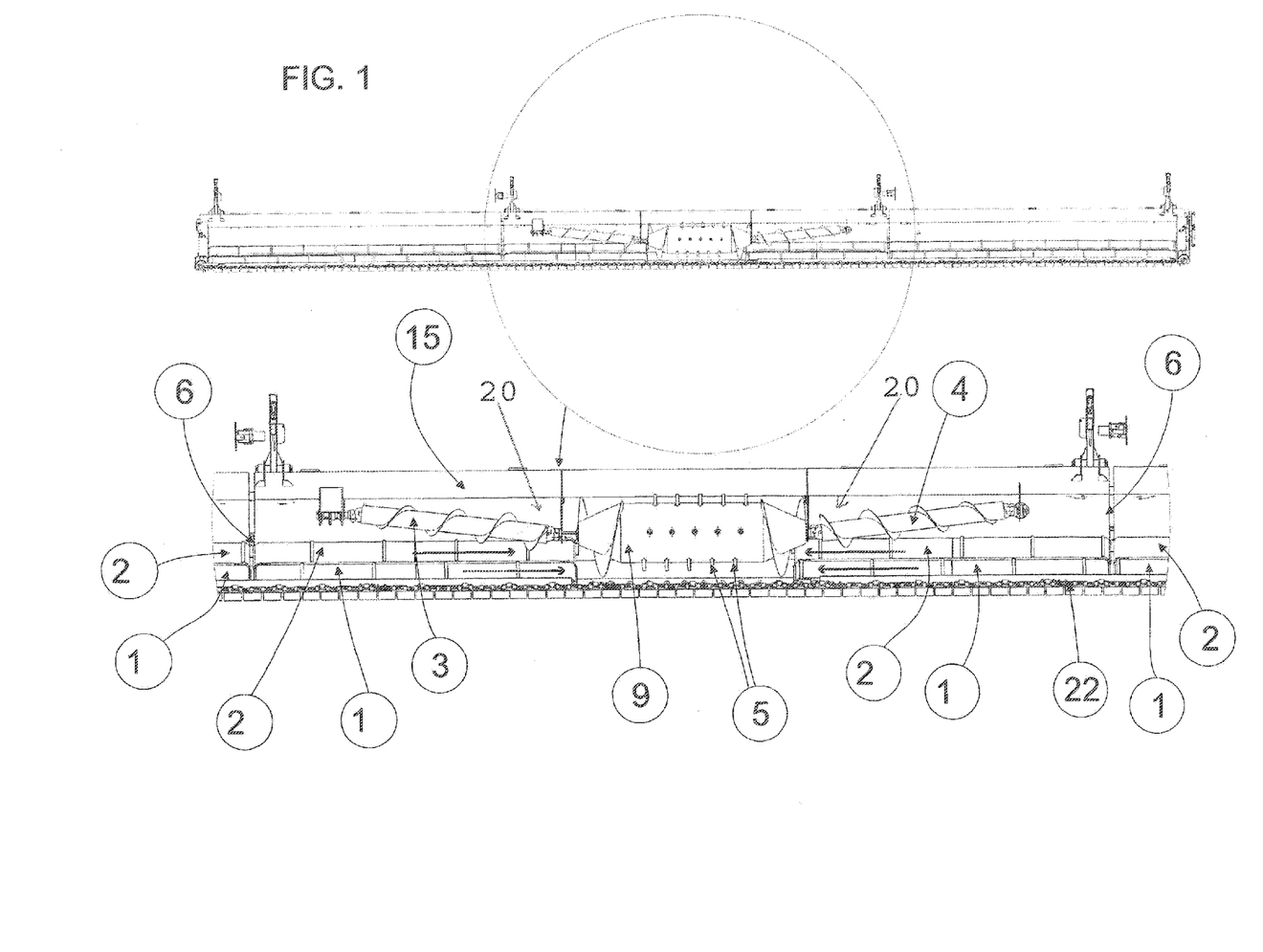
FIG. 1 shows a perspective front view of the flexible platform of the present invention and an amplifying detail of the same according to an exemplary embodiment of the present invention.
Figures 2A, 2B:
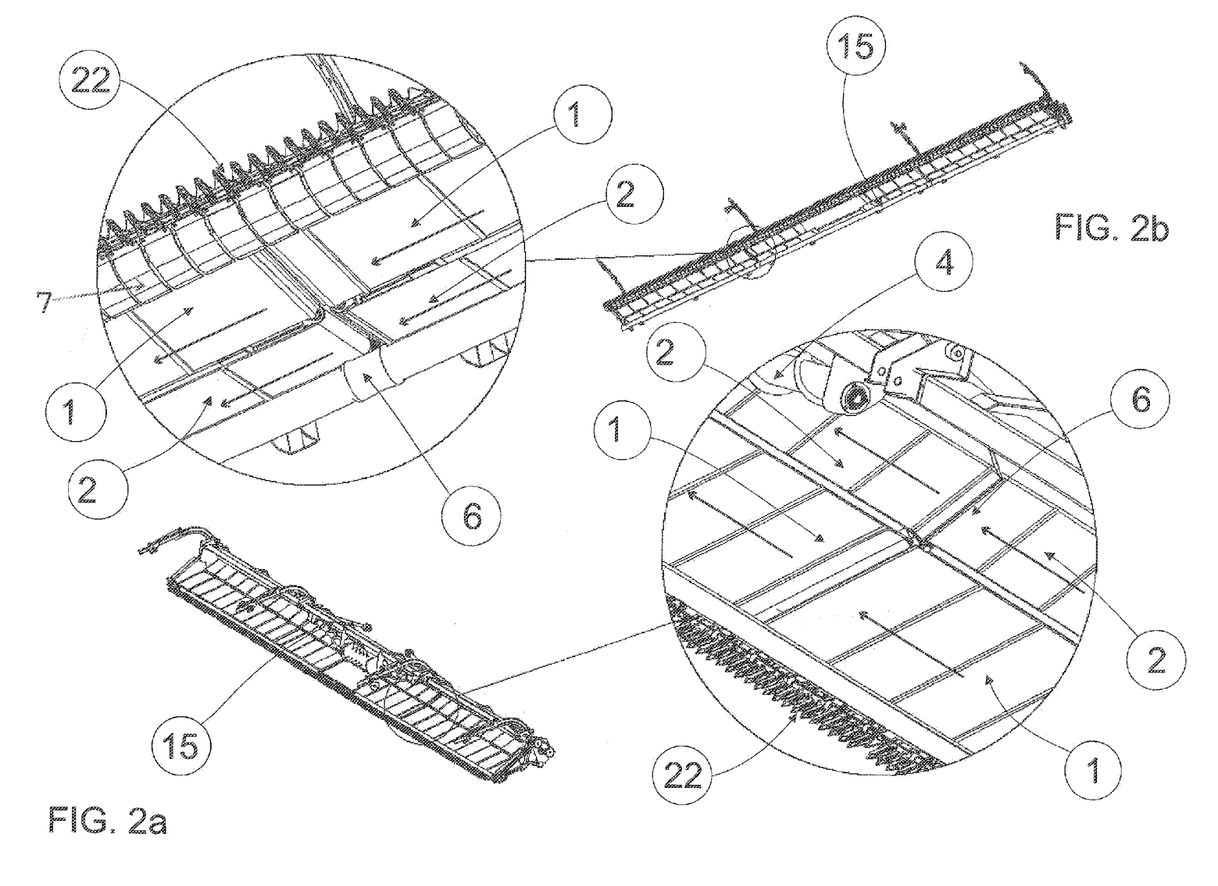
FIGS. 2a and 2b show detailed view of FIG. 1 showing the details of a platform
Figure 3:
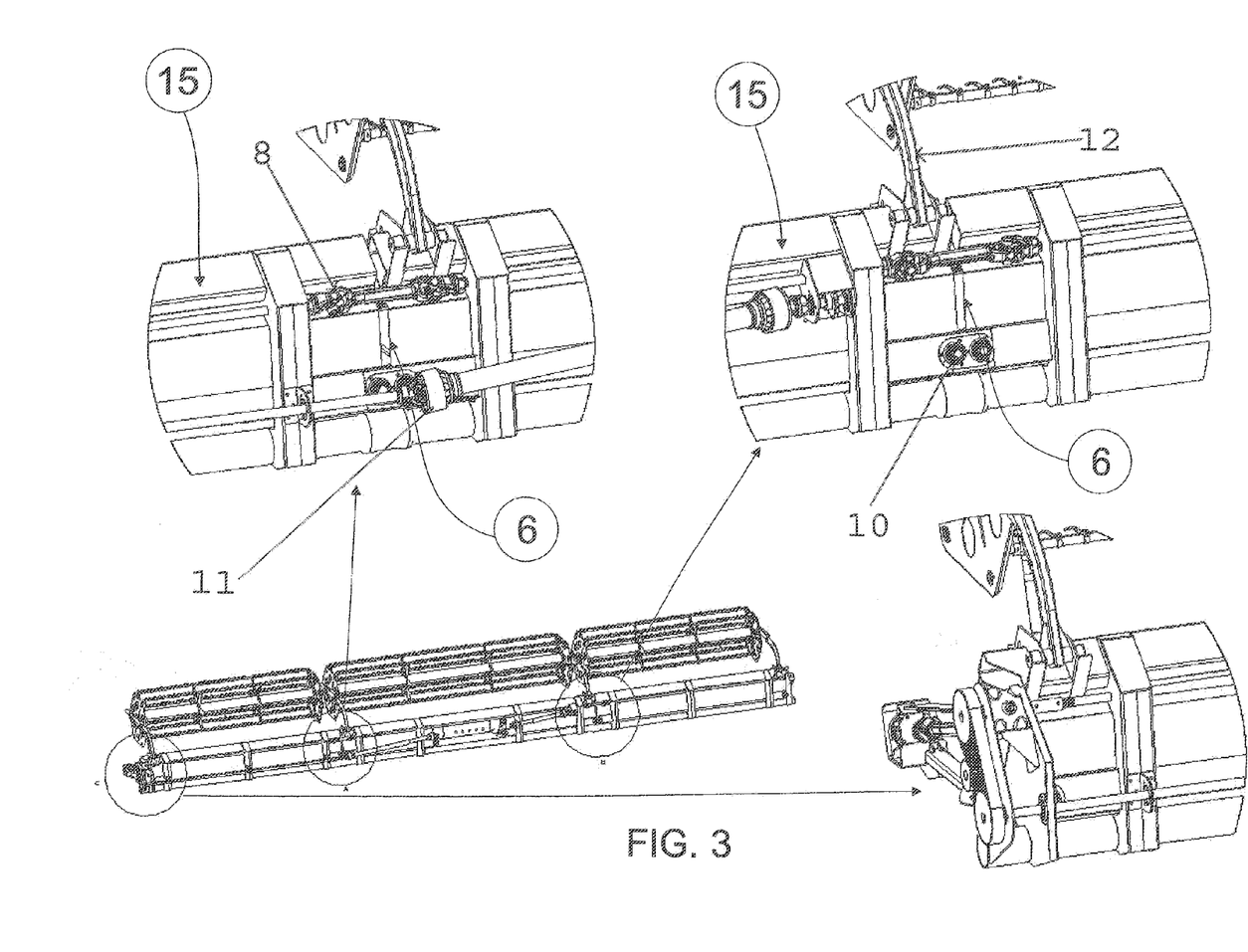
FIGS. 3, 4 and 5 show a plurality of jointed platforms and amplifying details of aforesaid figures.

Likewise, in mentioned FIGS. 2a 2b it is possible to use skids 7 where in the joint 6 and the pneumatic pump or hydraulic pump is leaned on the ground. In FIG. 3 a control gear 8 is shown, which allows to synchronize the cutting blades 22 with an axis that goes from the chassis' one side to the other, central auger 9, conveyor belts' commands 10, blades-box's command 11 and finally the support mill base 12.

In FIG. 4 it is possible to additionally observe the joint 6 of both laterals 13.

Figures 8A, 8B:
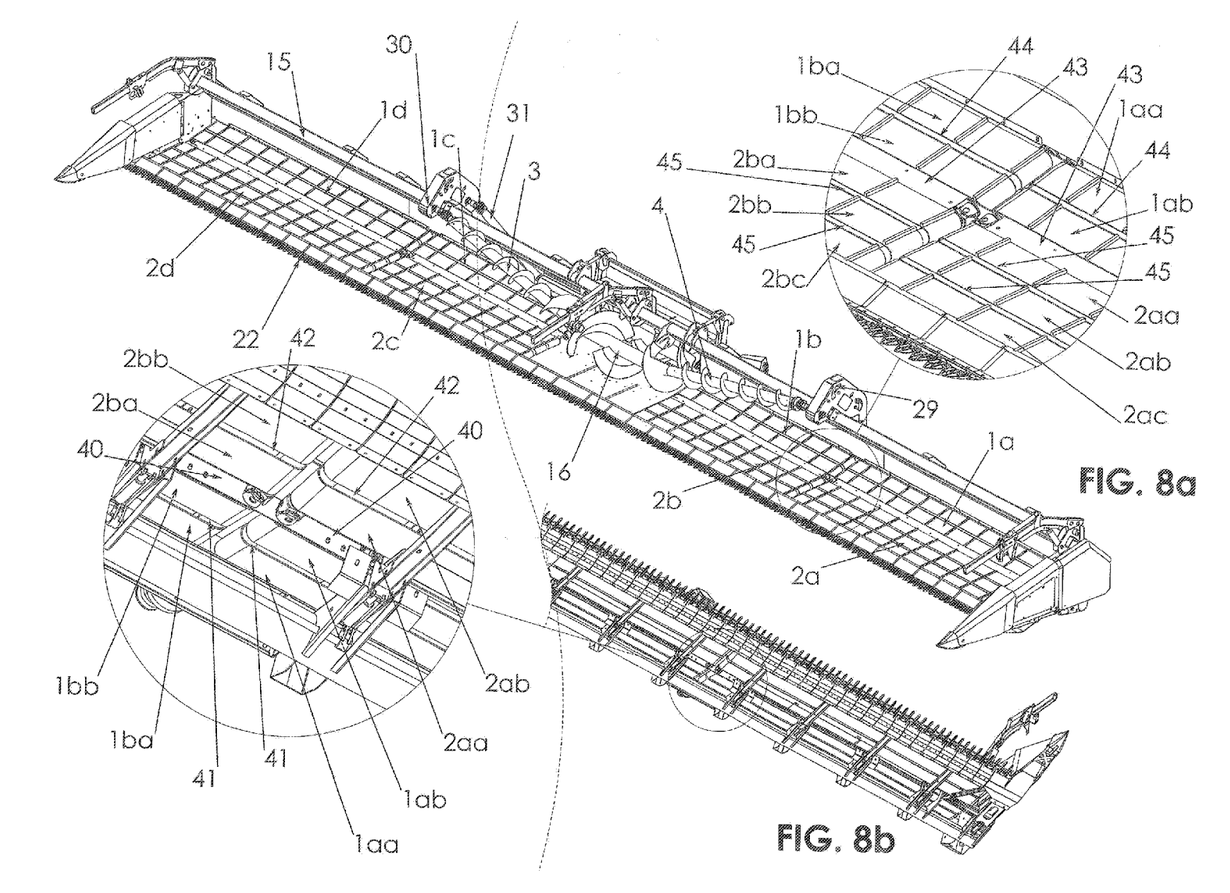
FIG. 8 shows a detailed view of the front and back belts, amplifying details of the belt split.

FIG. 8a shows a perspective view of the whole platform 15 with the auger set comprising: left oblique auger 4, front center auger 16, back center auger 17 (see FIG. 9a) and right oblique auger 3. The detailed view shows how the first conveyor belts and second conveyor belts 2 were split into narrower belts. It can be seen in the embodiment that: belt 1a was split into belts 1aa and 1ab, belt 2a was split into belts 2aa, 2ab and 2ac, belt 1b was split into belts 1ba and 1bb, belt 2B was split into belts 2ba, 2bb and 2bc. It can also be seen that the spaces between belts 44 and 45, as well as the spaces 43 between the first conveyor belt 1 and the second conveyor belt 2, are covered to impede cereal falling to the ground through this openings.

It is obvious that the number of narrower belts can be changed and adjusted to fit several options. In a preferred manner first conveyor belts 1 and second conveyor belts 2 can all be divided to the same width, and this way gain an advantage in repair time as one new replacement belt can be used as the spare part of any first conveyor belt or any second conveyor belt; it can also be useful if the operator decide to do belts rotation to help belt wear. As an example, first belt 1ab could be rotated with first belt 1ba and first belt 1aa rotated with first belt 1bb.

FIG. 8b shows a perspective down view of half platform 15. It can be seeing in the detailed view that, as opposed to the covered openings 43, covered openings 44 and covered openings 45 shown in FIG. 8a, the spaces among belts 40, spaces among belts 41 and spaces among belts 42 are all clear to allow trash and dirt to fall directly to the field, becoming this into a multiple points self-cleaning belt.

Figures 9A, 9B:
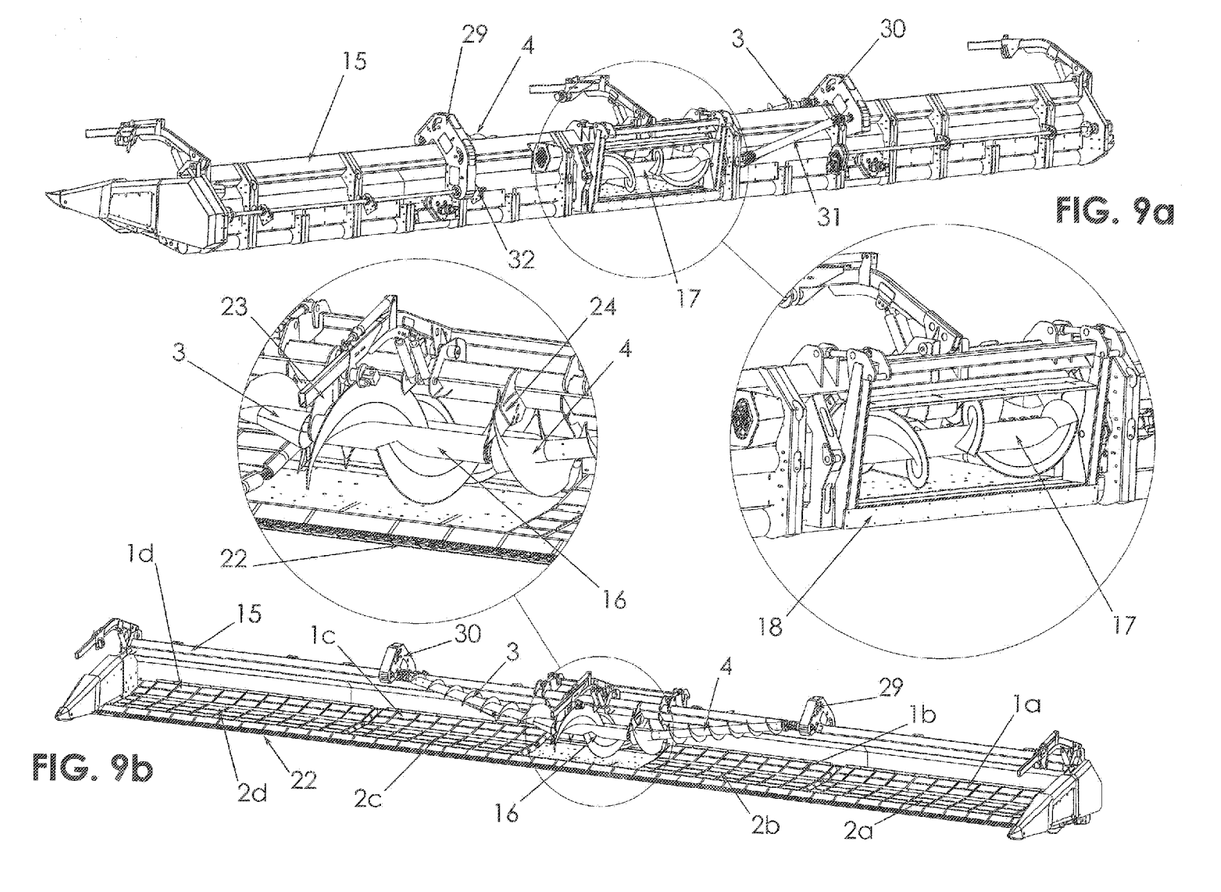
FIG. 9 shows a detailed front and back view of the central conveying multiple augers system.

FIG. 9a shows a perspective back view of the platform 15 displaying one method to synchronize the multiple auger central conveying system. The power from the combine reaches the chain drive box 29 through back shaft 32, then passes to the left oblique auger 4 which is directly connected to the front center auger 16 and this to the right oblique auger 3. Movement from right oblique auger 3 passes to the telescopic shaft 31 by the right chain drive box 30, which propels the back central auger 17.

It can be seeing in the detailed view that the back central auger 17 is just inside the attachment frame opening 18, very close to the combine feeder house.

FIG. 9b shows a perspective front view of the multiple synchronized-augers central conveying system. The detailed view shows the adjustable support of the front center auger 16, which is composed by the left support 24 and the right support 23, and brings the auger the option to be regulated on height and it distance to the back central auger 17 to boost the flow for various crop conditions.

It has to be noted that in the case of the shown figure, the position adjustment of the front center auger 16 is just mechanical and offered by the supports, but it can be hydraulically adapted if a proper hydraulic circuit with a cylinder is installed.

Figure 10A:
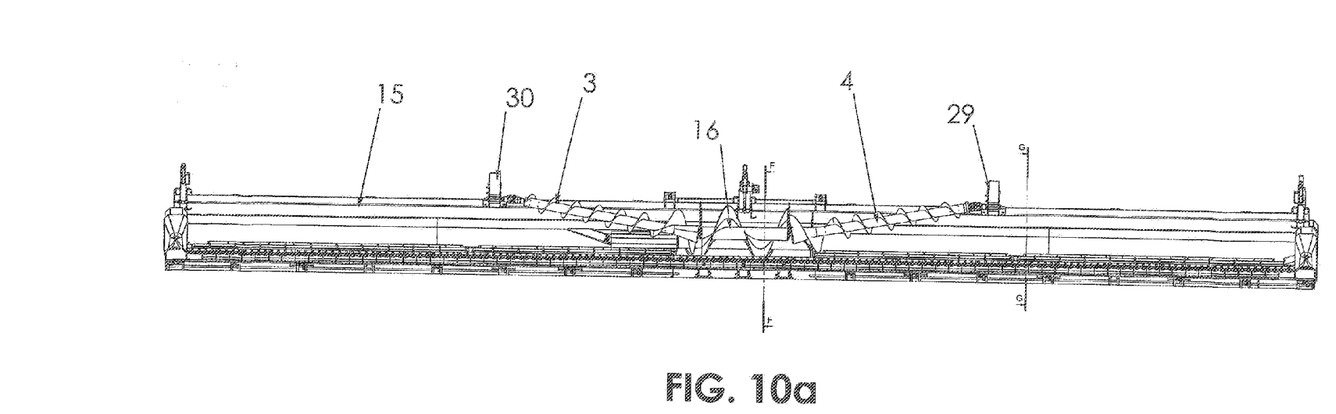
FIG. 10 shows sectional views of the conveying system of the present invention augmenting details about its location over the platform.

FIG. 10a shows a front view of the platform 15 marking off the cutting plane F-F and the cutting plane G-G that are used in the next figures to show its sectional view.

Figure 10B:
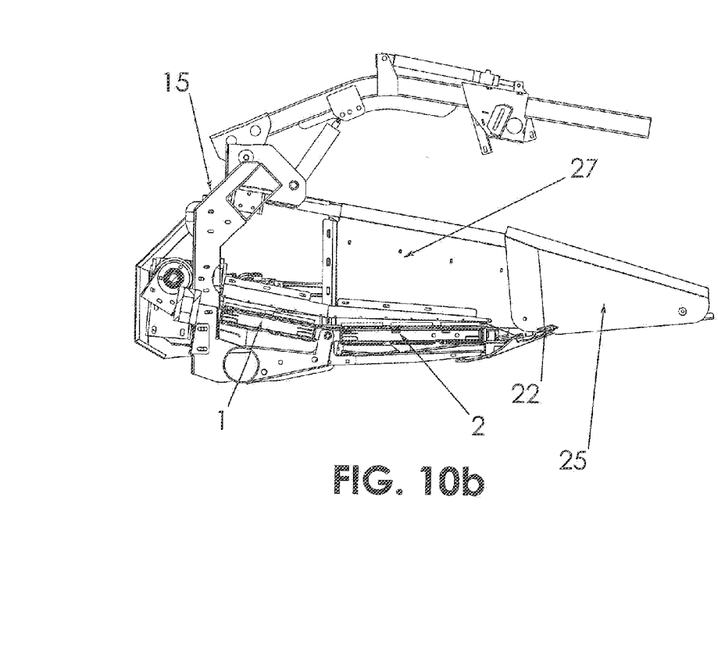

FIG. 10b shows the section G-G generated by the cutting plane G-G shown in the FIG. 10a. It can be seeing how the first conveyor belts 1 and the second conveyor belts 2 are placed related to the platform 15 height.

Figure 10C:
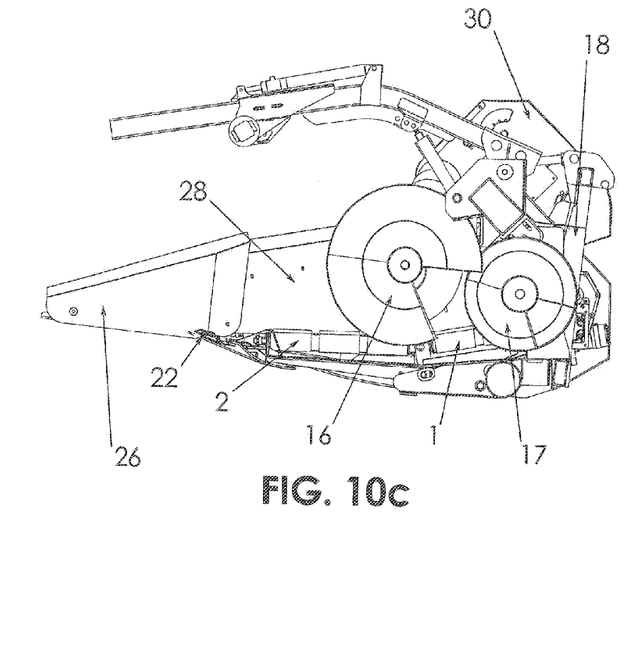

FIG. 10c shows the section F-F generated by the cutting plane F-F shown in the FIG. 10a. It can be seeing how the front central auger 16 and the back central auger 17 are placed in relation to: the first conveyor belt 1 and the second conveyor belt 2; the cutter bar 22; the attachment frame opening 18; the right divider 26 and the main frame right side; etcetera.

It is important to note that the number of central augers is not limited to two (2). A third or more middle central augers could be disposed to gain length of crop propellers.

What is claimed is:
1. A flexible platform for a combined harvesting, chopping, and spinning machine comprising:
    a platform having a first side and a second side;
    cutting blades located on the second side of the platform
    a back central auger located on the first side of the platform, the back central auger including a first side and a second side;
    a telescopic shaft having a first end connected to the back central auger;
    a right chain drive box having a first end connected to a second end of the telescopic shaft;
    a right oblique auger having a first end connected to a first side of a front central auger and a second end connected to the right chain drive box;
    the front central auger is located between the second side of the platform and the first side of the platform;
    a left oblique auger connected to a second side of the front central auger;
    a left chain drive box connecting the left oblique auger to a back shaft;

a first conveyor belt located on each one of the sides of both the front central auger and the back central auger;
a second conveyor belt located on each one of the sides of both the front central auger and the back central auger, each second conveyor belt is placed in parallel and adjacent to the corresponding first conveyor belt;
each second conveyor belt has a rigid belt that only moves for turning of the rigid belt;
each first conveyor belt has a flexible belt that moves towards the front central auger and also moves in relation to the corresponding second conveyor belt;
each first conveyor belt is divided into a plurality of belts;
each second conveyor belt is divided into a plurality of belts; and
each first conveyor belt is located between the cutting blades and the corresponding second conveyor belt.

2. The flexible platform according to claim 1, wherein each first conveyor belt moves at a speed different from a speed of the corresponding second conveyor belt.

3. The flexible platform according to claim 1, wherein each first conveyor belt has a shape different from a shape of the corresponding second conveyor belt.

4. The flexible platform according to claim 1, wherein each first conveyor belt has a width different from a width of the corresponding second conveyor belt.

5. The flexible platform according to claim 1, wherein each first conveyor belt is made of a material different from a material of the corresponding second conveyor belt.

6. A flexible platform for a combined harvesting, chopping, and spinning machine comprising:
a platform having a first side and a second side;
cutting blades located on the second side of the platform
a back central auger located on the first side of the platform, the back central auger including a first side and a second side;
a telescopic shaft connected to the back central auger;
a right chain drive box having a first end connected to the telescopic shaft;
a right oblique auger having a first end connected to a first side of the front central auger and a second end connected to the right chain drive box;
the front central auger located between the second side of the platform and the first side of the platform;
a left oblique auger connected to a second side of the front central auger;
a left chain drive box connecting the left oblique auger to a back shaft;
a first conveyor belt located on each one of the sides of both the front central auger and the back central auger;
a second conveyor belt located on each one of the sides of both the front central auger and the back central auger, each second conveyor belt is placed in parallel and adjacent to each first conveyor belt;
each second conveyor belt has a rigid belt that only moves for turning of the rigid belt;
each first conveyor belt has a flexible belt that moves towards the front central auger and also moves at an angle in relation to the corresponding second conveyor belt;
each first conveyor belt is divided into a plurality of belts;
each second conveyor belt is divided into a plurality of belts; and
each first conveyor belt is located between the cutting blades and the corresponding second conveyor belt.

7. The flexible platform according to claim 6, wherein the plurality of belts of each first conveyor belt have the same width.

8. The flexible platform according to claim 6, wherein the plurality of belts of each second conveyor belt have the same width.

9. The flexible platform according to claim 6 where the front central auger is nearer to the cutter bar than the back central auger.

10. The flexible platform according to claim 6, wherein the position of the front central auger is adjustable in respect to the platform floor.

11. The flexible platform according to claim 10, where the front central auger has a helical screw blade that moves material from left to right.

12. The flexible platform according to claim 6, wherein the position of the front central auger is adjustable in respect to the back central auger.

13. The flexible platform according to claim 6, where the back central auger, the right oblique angle, the front central auger, and the left oblique angle are all synchronized.

14. The flexible platform according to claim 6, where the back central auger has a helical screw blade that moves material from right to left.

15. The flexible platform according to claim 6, where the back central auger has a helical screw blade that moves material from left to right.

16. The flexible platform according to claim 6, where the front central auger has a helical screw blade that moves material from right to left.

17. The back central auger according to claim 16, where the helical screw blade of the front central auger, while rotating, is always in the same position as the helical screw blade of the front central auger.

* * * * *